(12) United States Patent
Burcham

(10) Patent No.: US 7,997,721 B1
(45) Date of Patent: Aug. 16, 2011

(54) SAFETY EYEWEAR DEVICE WITH HEARING PROTECTION

(76) Inventor: Mark A. Burcham, Elkton, MD (US)

( * ) Notice: Subject to any disclaimer, the term of this patent is extended or adjusted under 35 U.S.C. 154(b) by 0 days.

(21) Appl. No.: 12/846,155

(22) Filed: Jul. 29, 2010

(51) Int. Cl.
*G02C 5/20* (2006.01)
(52) U.S. Cl. ........................................ 351/123; 351/158
(58) Field of Classification Search .................. 351/158, 351/41, 121, 122, 123; 128/864, 866, 858, 128/857
See application file for complete search history.

(56) References Cited

U.S. PATENT DOCUMENTS

| | | | |
|---|---|---|---|
| 3,856,007 A | | 12/1974 | Leight |
| 4,632,104 A | * | 12/1986 | Conrow ........................... 602/74 |
| 4,902,120 A | * | 2/1990 | Weyer ............................ 351/158 |
| 5,475,449 A | | 12/1995 | Pyle |
| 5,703,670 A | * | 12/1997 | Callard ......................... 351/123 |
| 5,781,272 A | | 7/1998 | Bright et al. |
| 6,082,855 A | | 7/2000 | Fleming |
| D435,058 S | | 12/2000 | Green et al. |
| 6,340,227 B1 | | 1/2002 | Solberg et al. |
| 6,382,213 B1 | | 5/2002 | Sanpei |
| 6,728,974 B2 | | 5/2004 | Wadsworth |
| 7,213,916 B1 | | 5/2007 | Pettett |
| 2004/0085509 A1 | | 5/2004 | Lovelace |

* cited by examiner

*Primary Examiner* — Hung Dang

(57) ABSTRACT

A safety eyewear device featuring a pair of safety glasses including two ear extensions; and two earplug components each featuring an arm with an earplug, earplug components are attached to each extension of the safety glasses via an attachment means. The attachment means may include (i) an arm aperture disposed on the arm and one or more extension apertures disposed in the extensions, the extension apertures are adapted to be aligned with the arm aperture and a screw is threaded through the arm aperture and extension aperture to secure the earplug component to the extension; and (ii) an arm aperture disposed in the end of the arm and a slot disposed in the first end of the arm below the arm aperture, the slot is adapted to snugly slide around the respective extension, wherein a screw is threaded through the arm aperture to secure the arm to the extension.

2 Claims, 4 Drawing Sheets

SAFETY EYEWEAR DEVICE WITH HEARING PROTECTION

FIELD OF THE INVENTION

The present invention is directed to safety glasses and safety goggles, more particularly to safety glasses with a means of providing hearing protection.

BACKGROUND OF THE INVENTION

Earplugs or other means of hearing protection are oftentimes required for the same tasks that safety goggles or glasses are required. As such, some individuals use safety goggles and separate earplugs, and some individuals do not bother with ear or eye protection. The present invention features a safety eyewear device that features hearing protection. The device of the present invention helps provide users with a convenient means of accessing both eye and ear protection at the same time.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
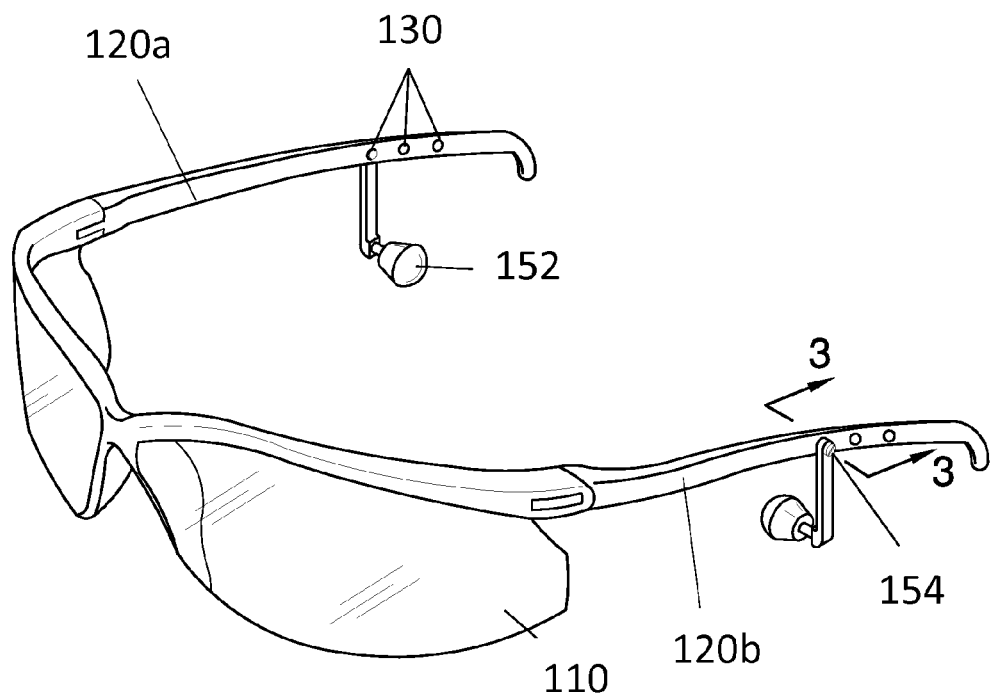
FIG. 1 is a perspective view of the safety eyewear device of the present invention.
Figure 2:
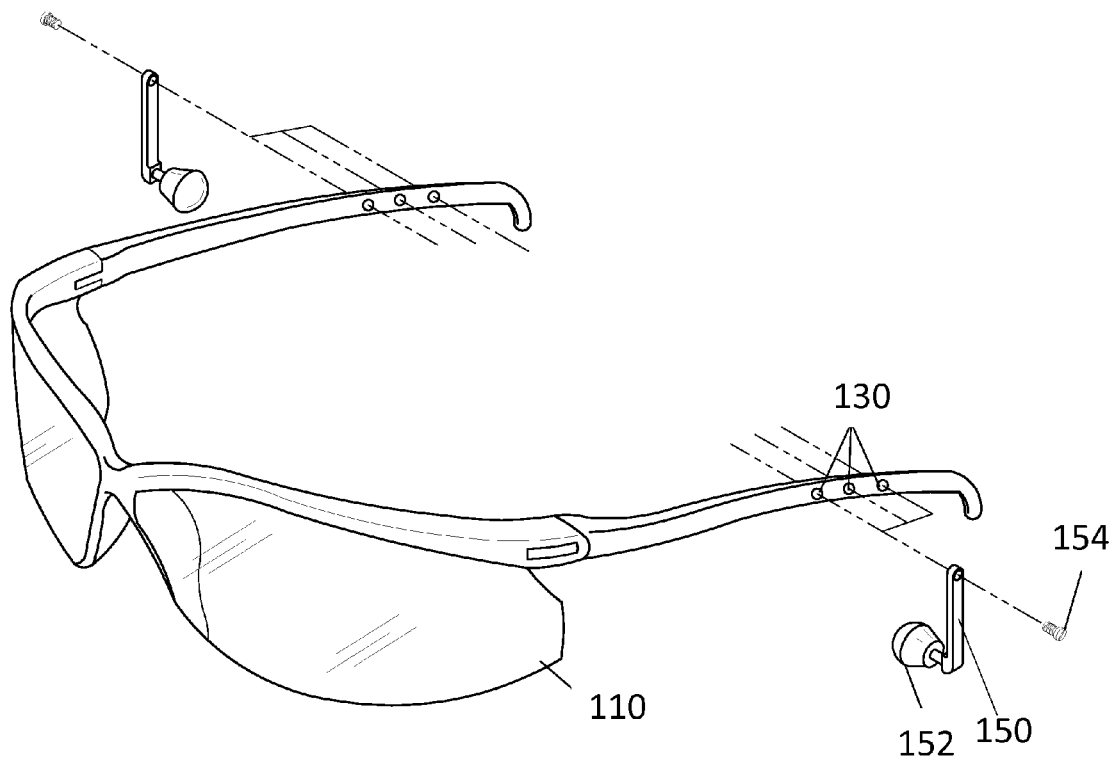
FIG. 2 is an exploded view of the safety eyewear device of FIG. 1.
Figure 3:
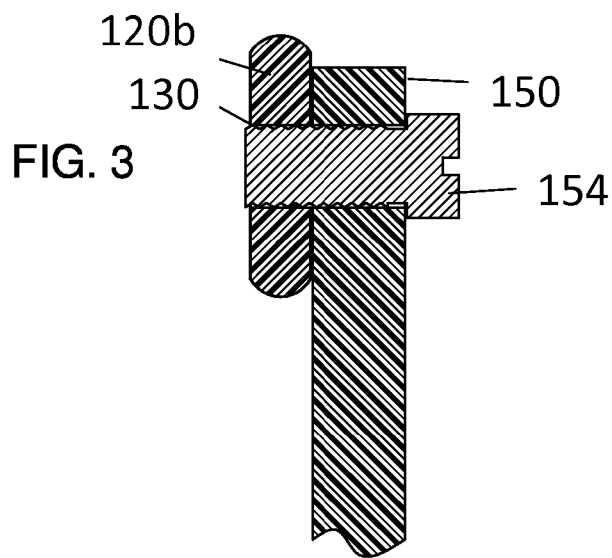
FIG. 3 is a cross sectional view of the safety eyewear device of FIG. 1.

Referring now to FIGS. 1-5, the present invention features a safety eyewear device 100. The device 100 of the present invention helps provide users with a convenient means of accessing both eye and ear protection at the same time. Without wishing to limit the present invention to any theory or mechanism, it is believed that the device 100 of the present invention is advantageous because it allows for adjustment of the arm both back and forth (by sliding) as well as at different angles to help fit the operator's ear. The device 100 can be adapted for various types of safety glasses. And the device 100 of the present invention is lightweight (not bulky) and may be constructed from smooth plastic material.

The safety eyewear device 100 of the present invention comprises a pair of standard safety glasses 110. Safety glasses are well known to one of ordinary skill in the art. For example, the safety glasses 110 comprise two eye pieces connected by a nose bridge and two elongated extensions for resting atop the user's ears (e.g., a first extension 120a and a second extension 120b). In some embodiments, the extensions 120a, 120b are adjustable in length (see FIG. 4).

The safety eyewear device 100 of the present invention further comprises two earplug components designed to removably attach to the safety glasses 110. The earplug components each comprise an arm 150 (e.g., elongated panel, tube, or stick) having a first end and a second end. Disposed on the second end of the arm 150 is an earplug 152.

The earplug components may be attached to the safety glasses 110 via an attachment means. For example, in some embodiments, the attachment means includes an arm aperture 150 disposed on the first end of an arm 150 and one or more extension apertures 130 disposed on the first extension 120a and the second extension 120b near the respective outer ends. The extension apertures 130 are adapted to be aligned with an arm aperture of the earplug component such that a screw 154 can be used to secure the earplug component to the extensions 120a, 120b.

Figure 4:
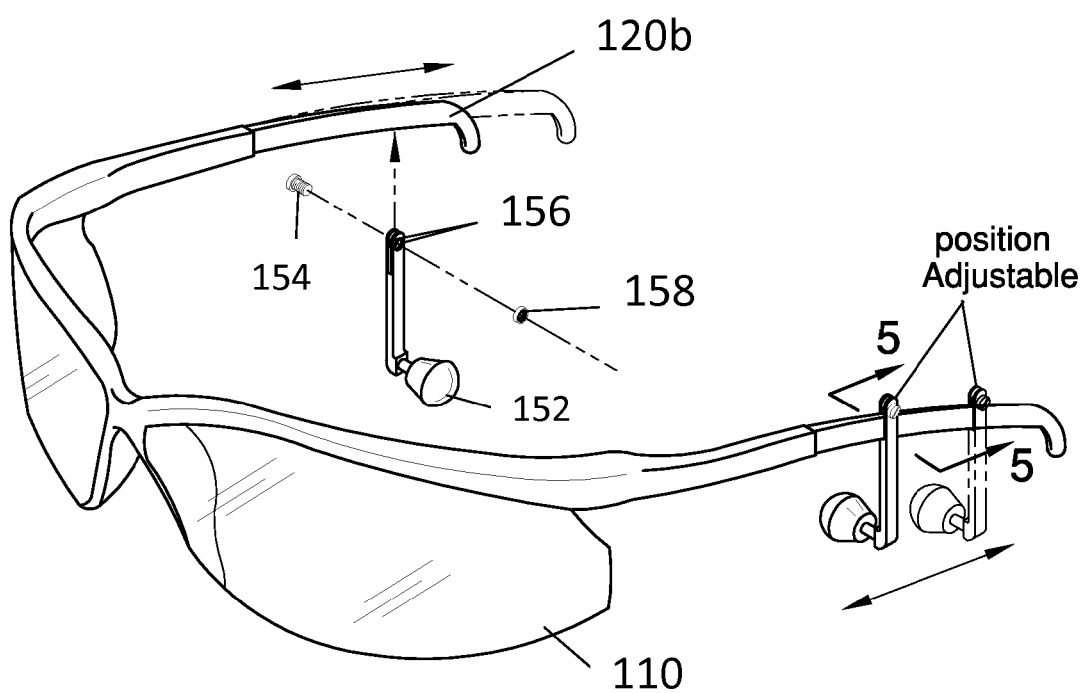
FIG. 4 is an exploded view of an alternative embodiment of the safety eyewear device the present invention.
Figure 5:
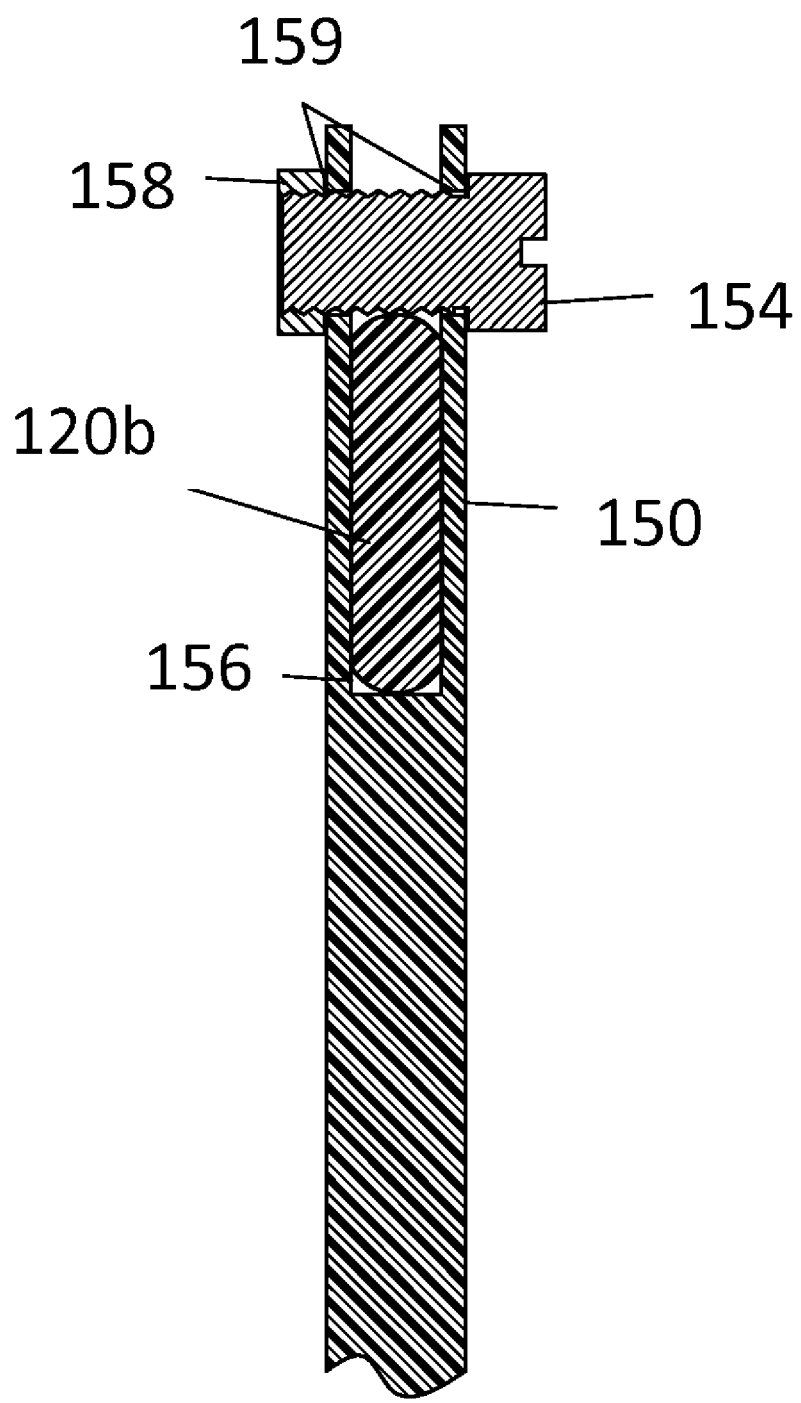
FIG. 5 is a cross sectional view of the safety eyewear device of FIG. 4.

In some embodiments, the attachment means includes a slot 156 disposed in the first end of the arm 150 of the earplug component, which is adapted to snugly slide around the extension 120a, 120b (see FIG. 4). When the arm 150 is positioned in place (according to the user's needs), a screw 154 and nut 158 can be used to secure the arm 150 to the extension 120a, 120b. For example, the screw 154 can be threaded through an arm aperture 159 disposed at the first end of the arm 150 (see FIG. 5). This allows the position of the arm 150 to be adjusted along the length of the extensions 120a, 120b.

The safety eyewear device 100 of the present invention may be constructed from a variety of materials. For example, the earplug component may be constructed from a material comprising plastic, for example to provide durability.

The disclosures of the following U.S. Patents are incorporated in their entirety by reference herein: U.S. Pat. No. 5,781,272; U.S. Pat. No. 6,340,227; U.S. Pat. Application No. 2004/0085509; U.S. Pat. No. 6,728,974; U.S. Pat. No. 6,082,855; U.S. Pat. No. 7,213,916; U.S. Pat. No. 5,475,449; U.S. Pat. No. 3,856,007; U.S. Pat. No. 6,382,213.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A safety eyewear device comprising:
   (a) a pair of safety glasses with two eye pieces connected by a nose bridge, and a first extension and a second extension each for resting atop a user's ear; and
   (b) two earplug components, each earplug component comprises an arm having a first end and a second end, wherein an earplug is disposed on the second end of the arm, wherein an earplug component is attached to each the first extension and the second extension of the safety glasses via an attachment means, the attachment means includes an arm aperture disposed in the first end of the arm of the earplug component and a slot disposed in the first end of the arm of the earplug component below the arm aperture, the slot is adapted to snugly slide around the respective extension, wherein a screw is threaded through the arm aperture to secure the arm to the extension as desired.

2. The safety eyewear device of claim 1, wherein the first extension and the second extension are each adjustable in length.

* * * * *